(12) United States Patent
Roth

(10) Patent No.: US 8,041,481 B2
(45) Date of Patent: Oct. 18, 2011

(54) POWER STEERING SYSTEM AND METHOD OF INFLUENCING THE DAMPING OF A POWER STEERING SYSTEM

(75) Inventor: Klaus Roth, Muehlheim (DE)

(73) Assignee: TRW Automotive GmbH (DE)

( * ) Notice: Subject to any disclaimer, the term of this patent is extended or adjusted under 35 U.S.C. 154(b) by 791 days.

(21) Appl. No.: 12/141,460

(22) Filed: Jun. 18, 2008

(65) Prior Publication Data

US 2008/0312794 A1 Dec. 18, 2008

(30) Foreign Application Priority Data

Jun. 18, 2007 (DE) .......................... 10 2007 027 948

(51) Int. Cl.
*B62D 5/04* (2006.01)
*B62D 5/06* (2006.01)
*B62D 6/00* (2006.01)

(52) U.S. Cl. ............ 701/41; 701/42; 180/421; 180/422; 180/444; 180/446

(58) Field of Classification Search .................. 180/417, 180/421, 422, 423, 428, 441, 442, 443, 444, 180/446; 701/41, 42, 44
See application file for complete search history.

(56) References Cited

U.S. PATENT DOCUMENTS

| 4,834,203 | A |   | 5/1989  | Takahashi et al. |        |
|-----------|---|---|---------|------------------|--------|
| 5,072,804 | A |   | 12/1991 | Bischof et al.   |        |
| 5,919,241 | A | * | 7/1999  | Bolourchi et al. | 701/41 |
| 6,647,329 | B2| * | 11/2003 | Kleinau et al.   | 701/41 |
| 7,383,111 | B2|   | 6/2008  | Takimoto et al.  |        |
| 7,546,191 | B2| * | 6/2009  | Lin et al.       | 701/42 |
| 7,549,504 | B2| * | 6/2009  | Krieger et al.   | 180/444|
| 2002/0033300 | A1 | * | 3/2002 | Takeuchi et al. | 180/446 |
| 2005/0080532 | A1 | * | 4/2005 | Kato et al.     | 701/41  |

FOREIGN PATENT DOCUMENTS

| DE | 38 22 171 C2 | 1/1989 |
| DE | 39 29 176 C2 | 3/1991 |
| DE | 103 32 023 A1 | 2/2004 |
| DE | 10 2005 044 896 A1 | 3/2006 |

* cited by examiner

*Primary Examiner* — Anne Marie Boehler
*Assistant Examiner* — Marc Scharich
(74) *Attorney, Agent, or Firm* — MacMillan, Sobanski & Todd, LLC

(57) ABSTRACT

A power steering system is disclosed herein that includes an electronic control unit that determines a set-point value for a damping moment in the power steering system. The system also includes a first sensor connected to the control unit and operable to determine a sign of a steering angle. The sign of the steering angle refers to a clockwise angle from dead center being designated as positive or negative and a counter-clockwise angle from dead center being assigned the other designation. The system also includes a second sensor connected to the control unit and operable to determine the sign of a steering wheel angular velocity. The sign of the steering wheel angular velocity refers to movement of the steering wheel in the clockwise direction being designated as positive or negative and movement in the counter-clockwise direction being assigned the other designation. The control unit can establish the set-point value for the damping moment with a predefined first damping multiplier when the steering angle and the steering wheel angular velocity have the same sign and with a predefined second damping multiplier when the steering angle and the steering wheel angular velocity have different signs.

4 Claims, 1 Drawing Sheet

POWER STEERING SYSTEM AND METHOD OF INFLUENCING THE DAMPING OF A POWER STEERING SYSTEM

CROSS-REFERENCE TO RELATED APPLICATIONS

This application claims priority to German Patent Application No. 10 2007 027 948.7 filed Jun. 18, 2007, the disclosures of which are incorporated herein by reference in their entirety.

BACKGROUND OF THE INVENTION

1. Field of the Invention

The invention relates to a power steering system for a motor vehicle and to a method of influencing the damping of a power steering system.

2. Description of Related Art

Power steering systems providing to the driver a steering assist force in steering maneuvers are generally known from the prior art. Regarding the damping behavior of a power steering system, it has turned out to be of advantage to damp any steering forces applied actively by the driver out of a center position of the steering wheel only slightly or not at all and, on the other hand, to provide stronger damping of an automatic return motion of the steering wheel into its center position (when the driver has largely released the steering wheel). Since, owing to the weak or absent damping, the steering behavior is very direct, the driver's own steering movements give him/her a secure steering feel. When the driver releases the steering wheel for an automatic return motion into the center position of the steering wheel, however, a strong damping of external impulses such as, e.g., bumps in the road will occur. This improves on the return motion properties of the steering system and on vehicle safety in general.

DE 39 29 176 C2, and corresponding U.S. Pat. No. 5,072,804 A1, both of which are incorporated by reference herein, already describes a power steering system in which different damping values may be provided depending on the direction of actuation of the steering wheel. The term direction of actuation of the steering system here means, for one thing, the cramping of the wheels, i.e. from driving straight ahead to driving around a bend, and, for the other, the returning of the wheels from driving around a bend to driving straight ahead. The input quantities used here are the angular velocity of the steering wheel and the steering torque, which are then converted into an appropriately adjusted damping moment in a complex process.

It is an object of the present invention to simplify the method of influencing the damping of a power steering system and to provide a power steering system which, depending on the respective steering situation, provides different damping moments involving little expense.

SUMMARY OF THE INVENTION

This is achieved by a power steering system according to the invention, including an electronic control unit that determines a set-point value for a damping moment in the power steering system, a first sensor, connected to the control unit, for determining the sign of a steering angle, and a second sensor, connected to the control unit, for determining the sign of a steering wheel angular velocity, the control unit establishing the set-point value for the damping moment with a predefined first damping multiplier when the steering angle and the steering wheel angular velocity have the same sign and with a predefined second damping multiplier when the steering angle and the steering wheel angular velocity have different signs. The only input quantities that need to be determined here for the steering-situation-dependent determination of a set-point value for the damping moment are the signs of the steering angle and of the steering wheel angular velocity. This can be done with little effort by means of simple sensors. Each sign combination then has a damping multiplier assigned to it, which enters into the calculation of the set-point value for the damping moment. In this way, it is possible in a very simple manner to influence the damping of a power steering system by means of the sign determination of the input quantities steering angle and steering wheel angular velocity, that are easy to establish, and by means of forming a sign combination.

Preferably, the first damping multiplier is smaller than the second damping multiplier. This ensures that the set-point value for the damping moment in an active steering movement made by the driver from driving straight ahead to driving around a bend is smaller than the set-point value for the damping moment in the automatic return motion of the steering wheel from driving around a bend to driving straight ahead.

The invention further relates to a method of influencing the damping of a power steering system, the method including the following method steps:

(a) determining the sign of a steering angle;
(b) determining the sign of a steering wheel angular velocity;
(c) selecting a predefined first damping multiplier if the signs of the steering angle and of the steering wheel angular velocity are the same, or selecting a predefined second damping multiplier if the signs are different; and
(d) establishing a set-point value for a damping moment in the power steering system with the aid of the damping multiplier selected.

Especially preferably, the first damping multiplier is smaller than the second damping multiplier. This simple method allows a greater or smaller damping moment to be provided, depending on the driving situation of the vehicle, by means of input quantities that are easy to establish.

Other advantages of this invention will become apparent to those skilled in the art from the following detailed description of the preferred embodiments, when read in light of the accompanying drawings.

DETAILED DESCRIPTION OF THE INVENTION

Figure 1:
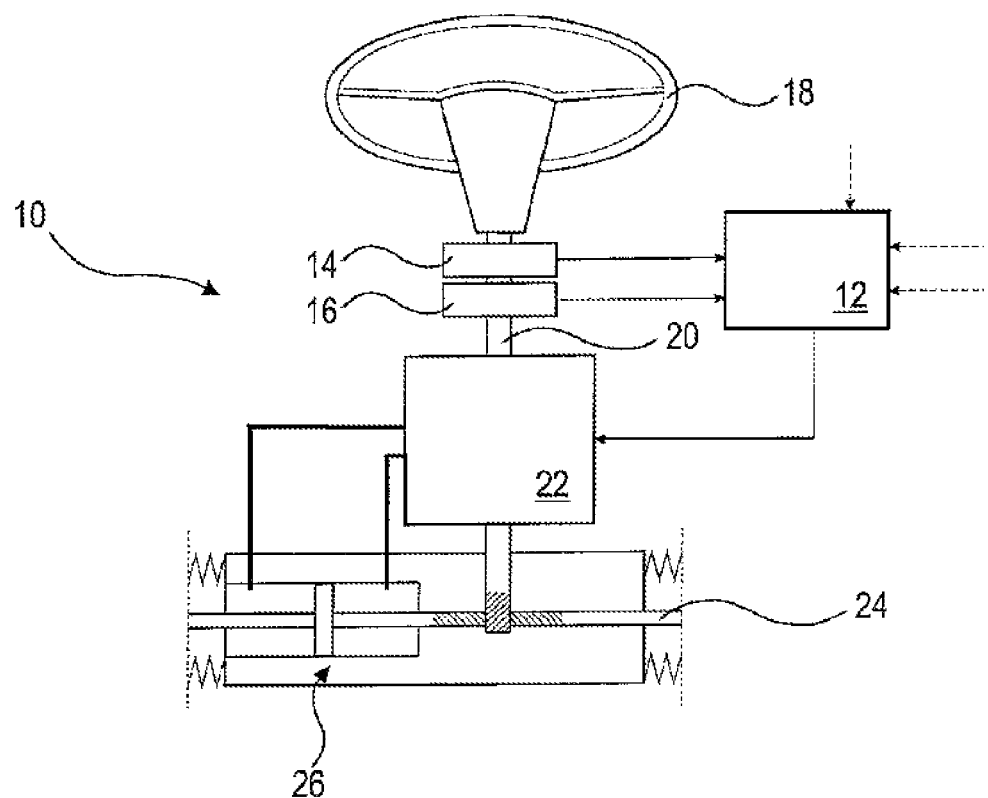
FIG. 1 shows a schematic diagram of a power steering system according to the invention.

FIG. 1 shows a power steering system 10, configured as a rack-and-pinion steering, including an electronic control unit 12 which determines a set-point value for a damping moment in the power steering system 10, a first sensor 14 connected to the control unit 12 for determining the sign of a steering angle α, and a second sensor 16 connected to the control unit 12 for determining the sign of a steering wheel angular velocity ω.

FIG. 1 further shows a steering wheel 18 and a steering linkage 20 which is in communication with a steering rack 24 of the vehicle steering system by means of a servo valve device 22.

On the basis of various parameters, the electronic control unit 12 ascertains a set-point value for a damping moment in the power steering, which is then passed on to the servo valve device 22. Two of these parameters are the data from the first sensor 14 and from the second sensor 16. In some embodiments, other parameters may be used additionally for ascertaining the set-point value, such as, e.g., the vehicle velocity. The servo valve device 22 thereupon causes a hydraulic fluid flow to be directed into the working chambers of a cylinder/piston unit 26 such that the desired damping moment in the power steering system 10 is obtained.

While FIG. 1 shows a hydraulic power steering system 10 having a servo valve device 22 and a cylinder/piston unit 26, the concept of the invention can also be applied by analogy to electromechanical power steering systems. In that case, the electronic control unit 12 drives an electric motor rather than the servo valve device 22, the electric motor moving the steering rack 24 via the steering linkage 20.

Figure 2:
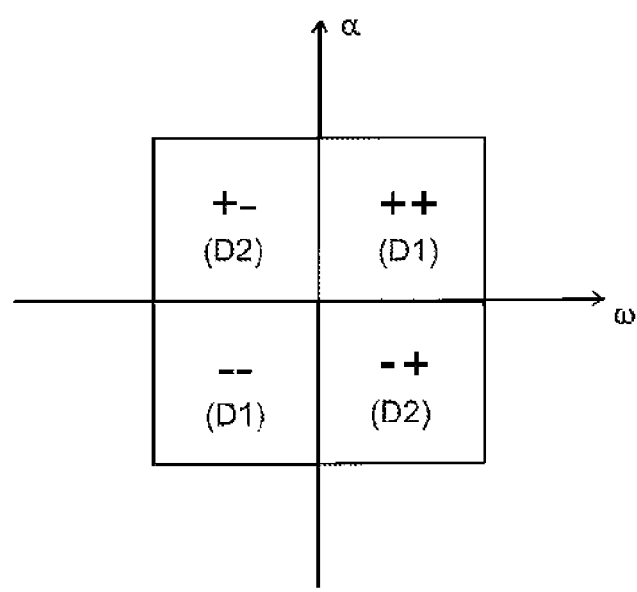
FIG. 2 shows a diagram for establishing a damping multiplier as a function of the signs of a steering angle and a steering wheel angular velocity.

FIG. 2 shows a chart in which the steering angle $\alpha$ is plotted against the steering wheel angular velocity $\omega$ (corresponds to $d\alpha/dt$). This chart is used to determine damping multipliers D1, D2, by means of which the set-point value for the damping moment of the power steering system 10 is ascertained. Since each quadrant of the chart has a fixed damping multiplier D1, D2 assigned to it, only the signs are of importance in the respective pairs of values while the exact numerical values of the steering angle $\alpha$ and the steering wheel angular velocity $\omega$ are not. Based on the sensor data of the first sensor 14 and the second sensor 16, a quadrant can be determined in the chart of FIG. 2 in which the pair of values lies. To this end, at first a direction of rotation of the steering wheel 18, e.g. a clockwise direction of rotation, is defined as being positive. This means that the steering angle $\alpha$ of a steering wheel 18 that has been rotated clockwise (in relation to the center position of the steering wheel) and a clockwise rotation of the steering wheel 18 is considered positive. When the steering wheel has been rotated counterclockwise in relation to its center position, the steering angle $\alpha$ is, accordingly, defined as being negative, just as the steering wheel angular velocity $\omega$ in a counterclockwise rotation of the steering wheel 18.

The sign combinations in the first and third quadrants (the steering angle $\alpha$ and the steering wheel angular velocity $\omega$ are both positive or both negative) are assigned to a first damping multiplier D1, and the sign combinations in the second and fourth quadrants (the steering angle $\alpha$ is positive and the steering wheel angular velocity $\omega$ is negative, or vice versa) are assigned to the second damping multiplier D2. When the signs are identical, the steering wheel 18 has already been rotated clockwise and clockwise rotation continues, or it has been rotated counterclockwise and such counterclockwise rotation continues. From this, it can be concluded that the driver makes an active steering movement, in which only minor or no damping at all is desired.

Different signs are indicative of the fact that the steering wheel 18 has already been rotated clockwise and is now being rotated counterclockwise, or that the steering wheel 18 has been rotated counterclockwise and is now being rotated clockwise. It may be inferred from this that the steering wheel 18 returns to its center position for traveling straight ahead, where a major damping of the power steering system 10 is desired.

The first damping multiplier D1 is therefore selected to be smaller than the second damping multiplier D2. The damping multipliers D1, D2 are predefined values which enter into a calculation of the set-point value for a damping moment in the power steering system 10. In a borderline case where the steering angle $\alpha$ and/or the steering wheel angular velocity $\omega$ assume(s) the value of zero, the respective pair of values may be assigned the first damping multiplier D1, the second damping multiplier D2, or an appropriate third damping multiplier D3 which is likewise predefined in the electronic control unit 12 and differs from the other two damping multipliers D1, D2.

The method of influencing the damping of the power steering system 10 will now be briefly discussed below. First, the sign of the steering angle $\alpha$ is determined continuously by means of the first sensor 14 and passed on to the electronic control unit 12. At the same time, the sign of the steering wheel angular velocity $\omega$ is determined by means of the second sensor 16 and is also passed on to the electronic control unit 12. In a further method step, if the signs of the steering angle $\alpha$ and of the steering wheel angular velocity $\omega$ are identical, the electronic control unit 12 selects the first damping multiplier D1 stored in the control unit 12, or, if the signs of the steering angle $\alpha$ and of the steering wheel angular velocity $\omega$ are different, it selects the second damping multiplier D2 stored in the control unit 12. In a further method step, using the first or the second damping multiplier D1, D2 as selected, the set-point value for the damping moment in the power steering system 10 is established in the control unit 12. Other input parameters such as, e.g., the vehicle velocity, may also enter into this set-point value ascertainment. The electronic control unit 12 then forwards the set-point value for the damping moment in the power steering system on to a servo drive which ensures the desired steering behavior of the power steering system 10. In electromechanical power steering systems 10, this servo drive may be an electric motor, and in hydraulic power steering systems 10, it may be a hydraulic pump with a coupled cylinder/piston unit 26. Since the first damping multiplier D1 is smaller than the second damping multiplier D2, the present method offers a very simple possibility of damping the power steering system 10 more strongly in an automatic return movement than in an opposite steering wheel movement performed by the driver.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A power steering system comprising:
   an electronic control unit operable to determine a set-point value for a damping moment in the power steering system;
   a first sensor connected to the control unit for determining a sign of a steering angle;
   a second sensor connected to the control unit for determining a sign of a steering wheel angular velocity; and wherein
   the control unit being operable to establish the set-point value for the damping moment with a predefined first damping multiplier when the steering angle and the steering wheel angular velocity have the same sign and with a predefined second damping multiplier when the steering angle and the steering wheel angular velocity have different signs.

2. The power steering system according to claim 1 wherein the first damping multiplier is smaller than the second damping multiplier.

3. A method of influencing the damping of a power steering system and comprising the steps of:
   (a) determining a sign of a steering angle;
   (b) determining a sign of a steering wheel angular velocity;

(c) selecting a predefined first damping multiplier if the signs of the steering angle and of the steering wheel angular velocity are the same, or selecting a predefined second damping multiplier if the signs are different; and
(d) establishing a set-point value for a damping moment in the power steering system with the aid of the damping multiplier selected.

4. The method according to claim 3 further comprising the step of:
assigning a lower value to the first damping multiplier than the second damping multiplier.

* * * * *